(12) United States Patent
Bassett et al.

(10) Patent No.: US 7,665,539 B2
(45) Date of Patent: Feb. 23, 2010

(54) AGRICULTURAL TILLAGE DEVICE

(75) Inventors: James H. Bassett, Sycamore, IL (US); Joseph D. Bassett, DeKalb, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 12/246,625

(22) Filed: Oct. 7, 2008

(65) Prior Publication Data
US 2009/0025618 A1  Jan. 29, 2009

Related U.S. Application Data

(62) Division of application No. 11/126,802, filed on May 11, 2005, now Pat. No. 7,451,712.

(60) Provisional application No. 60/650,389, filed on Feb. 4, 2005, provisional application No. 60/570,393, filed on May 12, 2004.

(51) Int. Cl.
*A01B 21/02* (2006.01)
*A01B 49/04* (2006.01)
*A01C 5/00* (2006.01)

(52) U.S. Cl. ............ 172/540; 111/140; 111/165; 111/166; 111/169

(58) Field of Classification Search .......... 111/139, 111/140, 143, 149, 157, 52, 163–167, 169; 172/561, 559, 862, 562, 518, 540
See application file for complete search history.

(56) References Cited

U.S. PATENT DOCUMENTS 1,260,752 A  3/1918  Casaday 1,321,040 A  11/1919  Hoffman (Continued)

FOREIGN PATENT DOCUMENTS

SU  392897  10/1973

(Continued)

OTHER PUBLICATIONS

Farm Journal Article, "Listen to your soil", pp. 14-15, Jan. 1993.

*Primary Examiner*—Christopher J. Novosad
(74) *Attorney, Agent, or Firm*—Nixon Peabody LLP

(57) ABSTRACT

An agricultural implement for clearing and tilling soil to be planted includes a residue-clearing sub-assembly including a first rotatable coulter wheel and at least one toothed wheel mounted for rotation about an axis located rearwardly of the axis of rotation of the first coulter wheel of forward portion of the toothed wheel overlaps a rear portion of the first coulter wheel. A tillage sub-assembly includes second and third coulter wheels that are offset from each other both laterally and fore and aft, and are mounted for rotation about axes of rotation that are located rearwardly of the axes of rotation of the toothed wheels. A depth control device is mounted for rotation about an axis of rotation located rearwardly of the axis of rotation of the rearmost of the second and third coulter wheels. A common frame carries the residue-clearing sub-assembly, the tillage sub-assembly, and the depth control device so that all of the axes of rotation are fixed relative to each other. An adjustable linkage is attached to the frame for allowing flotation of the unit on a contour.

7 Claims, 4 Drawing Sheets

U.S. PATENT DOCUMENTS

| | | |
|---|---|---|
| 1,391,593 A | 9/1921 | Sweeting |
| 1,791,462 A | 2/1931 | Bermel |
| 4,142,589 A | 3/1979 | Schlagenhauf |
| 4,187,916 A | 2/1980 | Harden et al. |
| 4,206,817 A | 6/1980 | Bowerman |
| 4,241,674 A | 12/1980 | Mellinger |
| 4,377,979 A | 3/1983 | Peterson et al. |
| 4,407,371 A | 10/1983 | Hohl |
| 4,550,122 A | 10/1985 | David et al. |
| 4,603,746 A | 8/1986 | Swales |
| 4,669,550 A | 6/1987 | Sittre |
| 4,785,890 A | 11/1988 | Martin |
| 5,076,180 A | 12/1991 | Schneider |
| 5,129,282 A | 7/1992 | Bassett et al. |
| 5,255,617 A | 10/1993 | Williams et al. |
| 5,341,754 A | 8/1994 | Winterton |
| 5,349,911 A | 9/1994 | Holst et al. |
| 5,394,946 A | 3/1995 | Clifton et al. |
| 5,443,125 A | 8/1995 | Clark et al. |
| 5,461,995 A | 10/1995 | Winterton |
| 5,462,124 A | 10/1995 | Rawson |
| 5,473,999 A | 12/1995 | Rawson et al. |
| 5,477,792 A | 12/1995 | Basset et al. |
| 5,479,992 A | 1/1996 | Bassett |
| 5,499,685 A | 3/1996 | Downing, Jr. |
| 5,623,997 A | 4/1997 | Rawson et al. |
| 5,640,914 A | 6/1997 | Rawson |
| 5,657,707 A | 8/1997 | Dresher et al. |
| 5,660,126 A | 8/1997 | Freed et al. |
| 5,685,245 A | 11/1997 | Bassett |
| 5,704,430 A | 1/1998 | Smith et al. |
| 5,709,271 A | 1/1998 | Bassett |
| 5,878,678 A | 3/1999 | Stephens et al. |
| RE36,243 E | 7/1999 | Rawson et al. |
| 5,970,892 A | 10/1999 | Wendling et al. |
| 6,223,663 B1 | 5/2001 | Wendling et al. |
| 6,314,897 B1 | 11/2001 | Hagny |
| 6,325,156 B1 | 12/2001 | Barry |
| 6,575,104 B2 | 6/2003 | Brummelhuis |
| 6,644,224 B1 | 11/2003 | Bassett |
| 6,834,598 B2 | 12/2004 | Juptner |
| 6,912,963 B2 | 7/2005 | Bassett |
| 7,044,070 B2 | 5/2006 | Kaster et al. |
| 2004/0094079 A1 | 5/2004 | Bassett |
| 2005/0217550 A1 | 10/2005 | Bassett |

FOREIGN PATENT DOCUMENTS

| | | |
|---|---|---|
| SU | 1410884 | 7/1988 | ium
AGRICULTURAL TILLAGE DEVICE

CROSS-REFERENCE TO RELATED APPLICATIONS

This application is a divisional of U.S. patent application Ser. No. 11/126,802, filed May 11, 2005, which claims priority to Provisional Application No. 60/650,389, filed Feb. 4, 2005 and Provisional Application No. 60/570,393 filed May 12, 2004, all of which are incorporated by reference in their entireties.

FIELD OF THE INVENTION

The present invention relates to agricultural implements and, more particularly, to agricultural devices for clearing and tilling the soil, and, if desired, simultaneously fertilizing the soil.

SUMMARY OF THE INVENTION

In accordance with one embodiment of the present invention, an agricultural implement for clearing and tilling soil to be planted includes a residue-clearing sub-assembly including a first rotatable coulter wheel and a pair of toothed wheels mounted for rotation about axes located rearwardly of the axis of rotation of the first coulter wheel. Forward portions of the toothed wheels overlap a rear portion of the first coulter wheel. A tillage sub-assembly includes second and third coulter wheels that are offset from each other both laterally and fore and aft, and are mounted for rotation about axes of rotation that are located rearwardly of the axes of rotation of the toothed wheels. A depth control device is mounted for rotation about an axis of rotation located rearwardly of the axis of rotation of the rearmost of the second and third coulter wheels. A common frame carries the residue-clearing sub-assembly, the tillage sub-assembly, and the depth control device so that all of the axes of rotation are fixed relative to each other. An adjustable linkage is attached to the frame for allowing flotation of the unit on a contour.

In one particular embodiment of the invention, the forward edges of the toothed wheels are tilted inwardly toward said first coulter wheel, the rearward edges of the second and third coulter wheels are tilted inwardly, and the lower edges of both the toothed wheels and the second and third coulter wheels are tilted inwardly.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Figure 1:
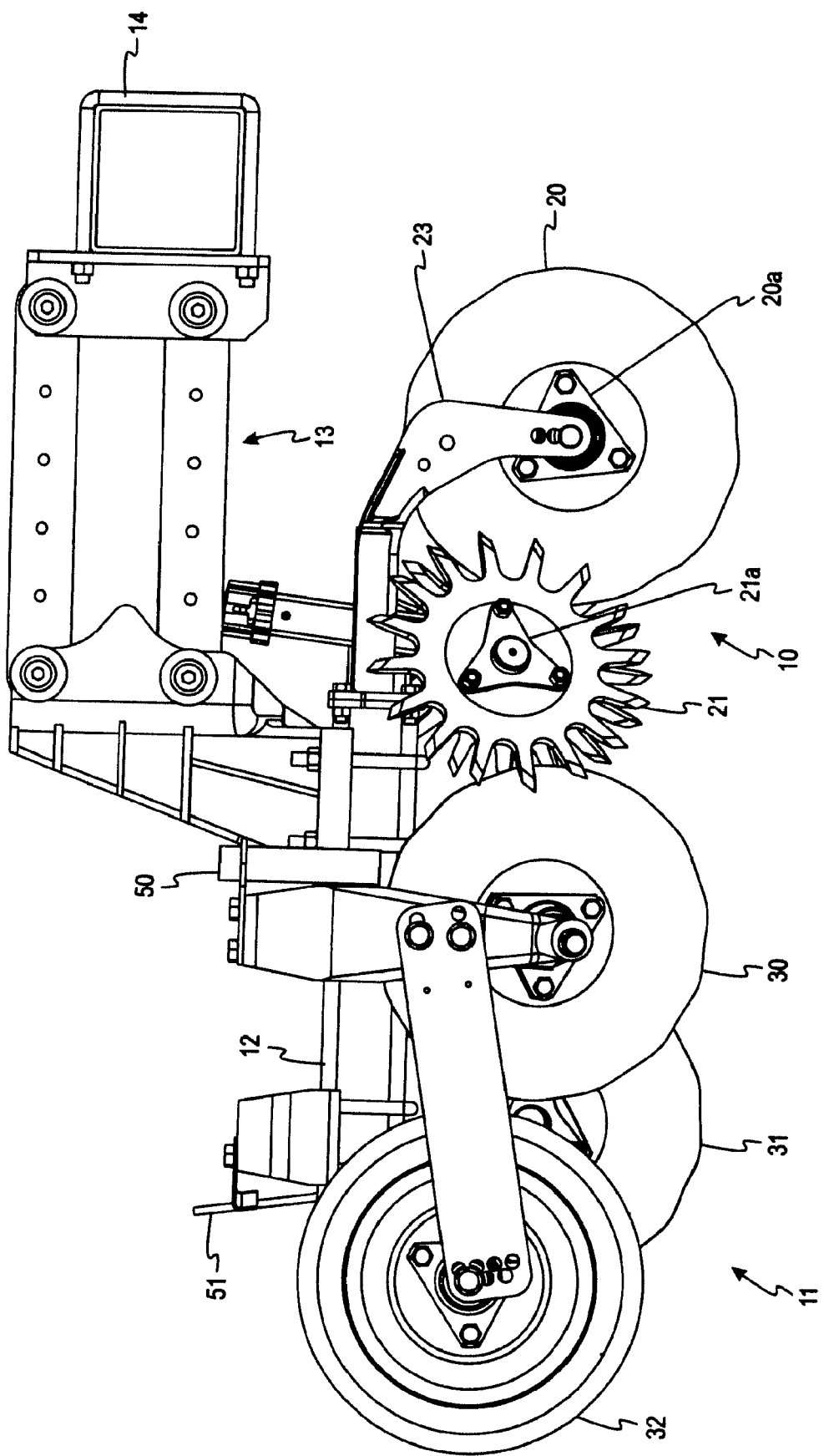
FIG. 1 is a side elevation of an agricultural implement embodying the invention.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, the illustrative implement includes a leading residue-clearing sub-assembly 10 followed by a trailing tillage and depth-control sub-assembly 11. Both sub-assemblies 10 and 11 are carried by a common elongated hollow frame 12 attached to the rear end of a four-bar linkage assembly 13, which in turn is attached to front frame 14 adapted to be connected to the tool bar of a tractor. Because both sub-assemblies 10 and 11 are carried by the same frame 12, the relative relationship of all the components of the two sub-assemblies 10 and 11 remains fixed so that they maintain a consistent set of dynamic properties governed by their relative sizes and positions rather than just the individual properties of the individual components.

As described in U.S. Pat. No. 6,644,224, the residue-clearing sub-assembly 10 comprises a coulter wheel 20 flanked by a pair of toothed wheels 21 and 22 overlapping a rear edge portion of the coulter wheel 20. The coulter wheel 20 cuts through the residue on the soil, such as stalks from a previous year's planting, and cuts a shallow slit in the soil. The trailing toothed residue-clearing wheels 21 and 22 then kick the cut residue off to opposite sides of the slit cut by the wheel 20, thus clearing a row for planting, while at the same time cleaning the coulter wheel 20. To this end, the front edges of the toothed wheels 21 and 22 are tilted inwardly toward the vertical plane of the coulter wheel 20 to assist in cleaning the coulter wheel, and the lower edges are tilted outwardly to assist in clearing the row to be planted. This arrangement is particularly well suited for strip tilling, where the strip cleared for planting is typically only about 10 inches of the 30-inch center-to-center spacing between planting rows.

The coulter wheel 20 and the two toothed wheels 21 and 22 are each journaled on a separate arm fastened rigidly to the frame 12, supported in such a way that, viewing a rear elevation, no frame member lies in a horizontal plane between the two coulter wheels in the sub-assembly 11 (described below). Thus, the hub assembly 20a of the coulter wheel is mounted on the lower end of an L-shaped arm 23 which is rigidly attached at its upper, rear end to the frame 12, and the hub assemblies 21a and 22a of the toothed wheels 21 and 22 are mounted on the lower end of respective L-shaped arms 24 and 25, which are also rigidly attached to the frame 12. With this arrangement, the wheels 20-22 are all free to rotate relative to each other, but the relationship of their axes of rotation remains fixed.

The tillage and depth-control sub-assembly 11 comprises a pair of coulter wheels 30 and 31 which are offset from each other both laterally and fore and aft, and a gage wheel 32. The rear edges of the coulter wheels 30 and 31 are tilted inwardly toward the slit cut by the coulter wheel 20, and the lower edges are tilted outwardly. Thus, each of the coulter wheels 30 and 31 contacts the soil at an angle in two planes, which causes each wheel to apply a force to the soil that is upward and toward the center of the row. The aggregate effect that this angularity has on the soil is a turbulent swirling and mixing of the soil in the space between the two coulter wheels 30 and 31, which incorporates air and residue into the soil, as well as breaking the soil into finer pieces. Soil thrown laterally by the leading coulter wheel 30 is caught by the coulter wheel 31 to retain that soil in the tilled area between the two coulter wheels 30 and 31 and to form a ridge for planting.

The gage wheel 32 controls the depth to which the entire unit penetrates into the soil, and also catches soil thrown laterally by the rear coulter wheel 31, to retain that soil in the strip being tilled. This prevents soil loss from the tilled area and facilitates the creation of a ridge or berm, which is desirable for planting. Because the height of the axes of rotation of all the wheels 20-22 and 30-31 are fixed relative to the height of the axis of rotation of the gage wheel 32, the interaction among all the wheels remains essentially the same at all times.

The frame 12 is attached to the rear end of a four-bar linkage 40 that is attached at its forward end to the frame 14 adapted to be connected to the tool bar of a tractor or to a larger implement. The four-bar (sometimes referred to as "parallel-bar") linkage 40 is a conventional and well known linkage used in agricultural implements to permit the raising and lowering of tools attached thereto.

Figure 2:
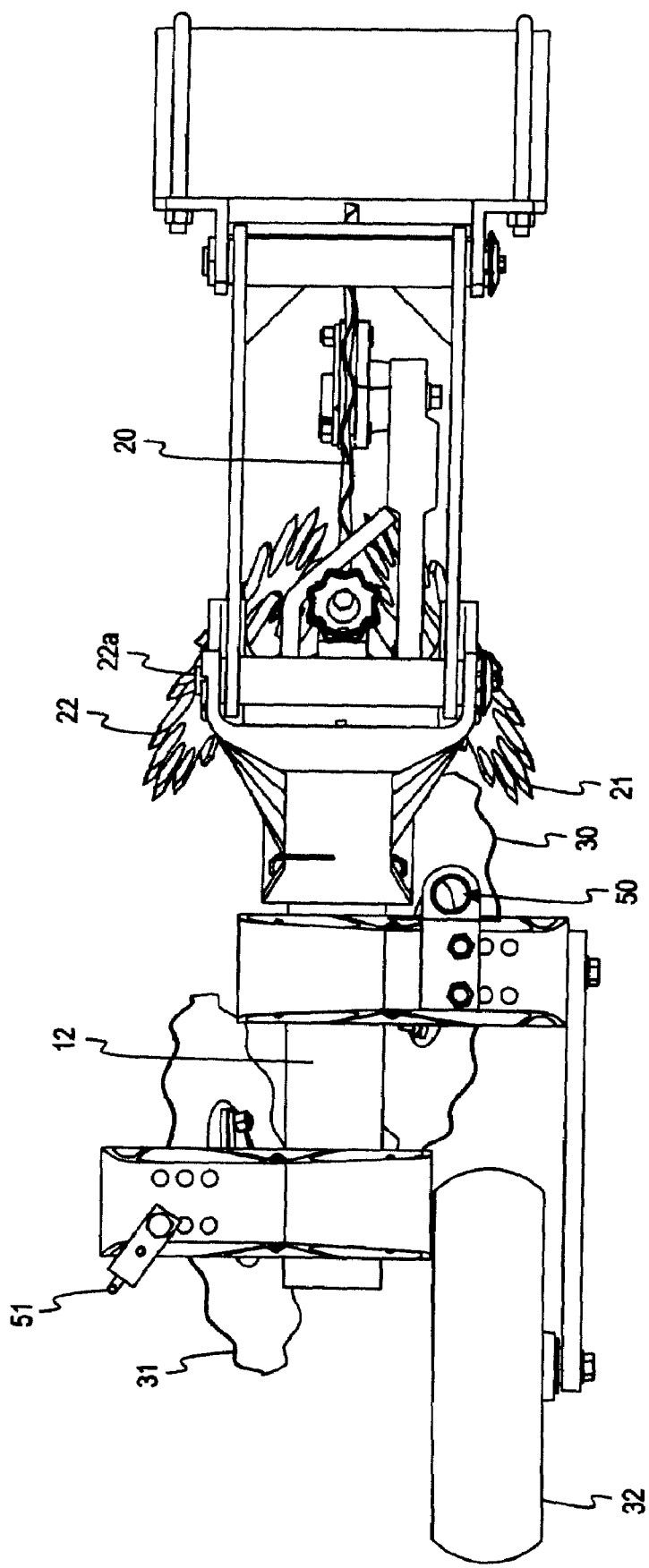
FIG. 2 is a top plan view of the agricultural implement shown in FIG. 1.
Figure 3:
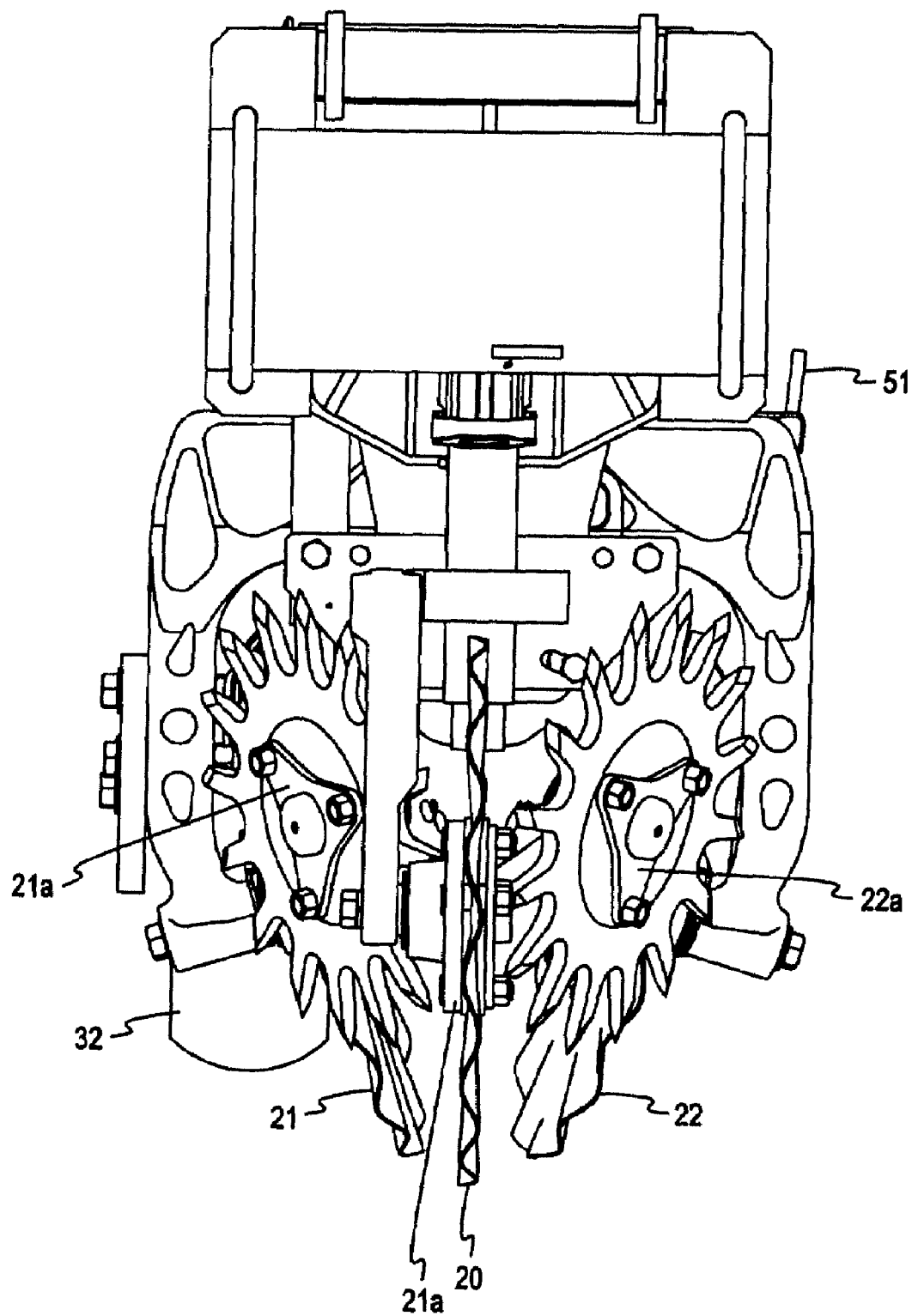
FIG. 3 is an end elevation of the right-hand end of the agricultural implement shown in FIG. 1.
Figure 4:
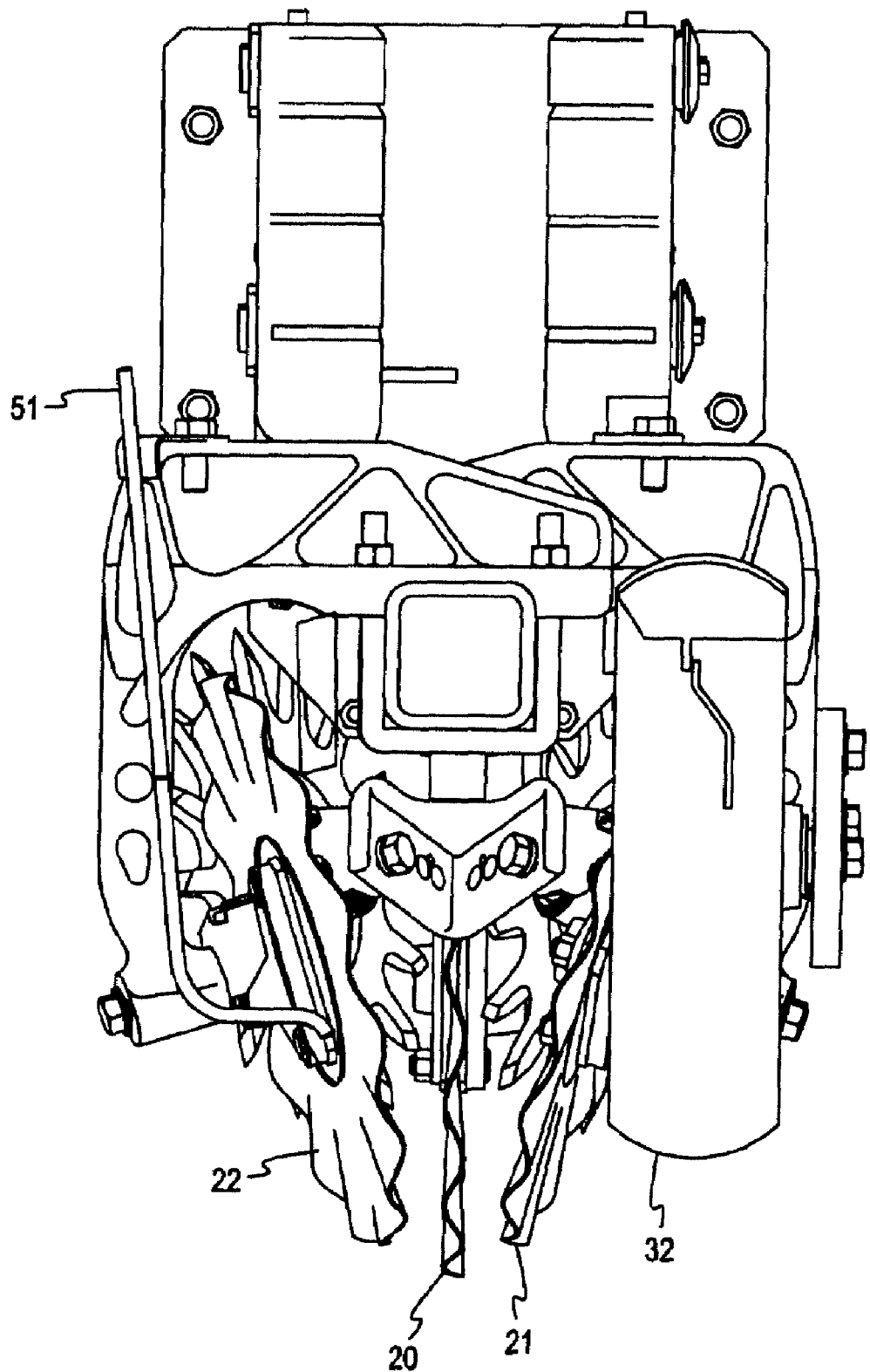
FIG. 4 is an end elevation of the left-hand end of the agricultural implement shown in FIG. 1.

In the particular embodiment illustrated in FIGS. 1-4, all the coulter wheels 20, 30 and 31 are corrugated or fluted coulter wheels, but a wide variety of different coulter wheels are well known in the agricultural industry, and any of them may be used in the present invention. The same is true of the residue-clearing wheels 21 and 22—a wide variety of different configurations of toothed wheels are well known in the agricultural industry for residue clearing, and any of them may be used in this invention.

It is typically desirable to apply fertilizer to the soil at the same time the soil is tilled. For this purpose, the illustrative row unit includes optional fertilizer delivery tubes 50 and 51 positioned to discharge fertilizer onto the soil in the space between the two coulter wheels 30 and 31. Dry fertilizer is delivered through the tube 50. Liquid fertilizer is delivered through the tube 51, or a conventional injector may be used to deliver liquid fertilizers under pressure if desired.

By using rotating elements to clear and till the soil and form the clear strip or mound, the illustrative implement requires a relatively small amount of tractor power to pull through the soil. Having all rotating elements on a floating frame also permits the implement to operate in extremely rocky conditions by floating up and over rocks without lifting rocks to the surface where they interfere with field operations. Having all rotating elements also eliminates the need for knife or shank shear bolt or trip/reset protection systems in rocky areas.

The illustrative row unit is urged downwardly against the soil by its own weight. If it is desired to have the ability to increase this downward force, or to be able to adjust the force, a hydraulic or pneumatic cylinder and/or one or more springs may be added between the frame 12 and the linkage 13 or frame 14 to urge the frame 12 downwardly with a controllable force. Such a hydraulic cylinder may also be used to lift the row unit off the ground for transport by heavier, stronger, fixed-height frame that is also used to transport large quantities of fertilizer for application via multiple residue-clearing and tillage row units. This hydraulic or pneumatic cylinder may be controlled to adjust the downward force for different soil conditions such as is described in U.S. Pat. Nos. 5,709,271, 5,685,245 and 5,479,992.

To facilitate the use of the illustrative implement as an attachment to a larger implement such as a planter, an attachment plate may be provided at the end of the frame 12 to serve as an interface with the larger implement. A few bolts may then be used to attach the implement as a striptill row unit on a planter or other larger implement. Alternatively, a planter row unit may be attached to the rear of the frame 12 to plant seed directly in the cleared strip as a one-pass tillage and planting machine.

The strip till operation may be completed in the fall after harvest of the previous crop or in the early spring prior to planting time. The user of the implement of this invention may gain further extended seasonal use from his equipment by utilizing at least a portion the implement as a carrier for a seeding unit in the spring. A seeding unit such as the John Deere "Max-Emerge" planter row unit, the seeding system described in U.S. Pat. No. 5,603,269, or other known seeding apparatus may be removeably attached to the frame 12 to provide a multi-use tool that reduces the number of separate implements required on a farm.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for clearing and tilling soil to be planted, comprising
    a tillage assembly including first and second coulter wheels having axes of rotation, said first and second coulter wheels being offset from each other both laterally and fore and aft, and overlapping each other fore and aft with the trailing edge of said first coulter wheel located closer to the path of said second coulter wheel than the leading edge of said first coulter wheel, and the trailing edge of said second coulter wheel located closer to the path of said first coulter wheel than the leading edge of said second coulter wheel,
    a common frame carrying said tillage assembly so that said axes of rotation are fixed relative to each other, and
    a four-bar linkage attached to said frame.

2. The agricultural equipment of claim 1 in which the leading edge of said second coulter wheel is located rearwardly of the axis of rotation of said first coulter wheel.

3. The agricultural equipment of claim 1 which includes a residue-clearing sub-assembly including a third rotatable coulter wheel and at least one toothed wheel mounted for rotation about an axis located rearwardly of the axis of rotation of said third coulter wheel, said first and second coulter wheels being mounted for rotation about axes of rotation that are located rearwardly of the axis of rotation of said toothed wheel.

4. The agricultural equipment of claim 1 which includes a depth control device mounted for rotation about an axis of rotation located rearwardly of the axis of rotation of the rearmost of said first and second coulter wheels and positioned to intercept soil displaced laterally by said rearmost coulter wheel.

5. An agricultural implement for clearing and tilling strips of soil to be planted, comprising
    a residue-clearing sub-assembly including a first rotatable coulter wheel and at least one toothed wheel mounted for rotation about an axis located rearwardly of the axis of rotation of said first coulter wheel,
    a tillage sub-assembly including second and third coulter wheels mounted for rotation about axes of rotation that are located rearwardly of the axis of rotation of said at least one toothed wheel, said second and third coulter wheels being located on opposite sides of the path of said first coulter wheel, overlapping each other fore and aft with the leading edge of said third coulter wheel located rearwardly of the axis of rotation of said second coulter wheel and with the trailing edge of said second coulter wheel located closer to the path of said third coulter wheel than the leading edge of said second coulter wheel, and the trailing edge of said third coulter wheel located closer to the path of said second coulter wheel than the leading edge of said third coulter wheel, a depth control device mounted for rotation about an axis of rotation located rearwardly of the axis of rotation of the rearmost of said second and third coulter wheels and positioned to intercept soil displaced laterally by said rearmost coulter wheel, and a common frame carrying said residue-clearing sub-assembly, said tillage sub-assembly, and said depth control device so that all of said axes of rotation are fixed relative to each other.

6. The agricultural equipment of claim 5 in which the center of each of said second and third coulter wheels is laterally offset from the path of said first coulter wheel by a distance that is less than the radius of said second coulter wheel so that each of said second and third coulter wheels apply a force to the soil that is upward and toward the center of the strip being tilled.

7. The agricultural equipment of claim 5 in which the lower edge of each of said second and third coulter wheels is located closer to the path of said first coulter wheel than the upper edge of the same coulter wheel.

* * * * *